(12) United States Patent
Basey

(10) Patent No.: US 6,527,417 B2
(45) Date of Patent: Mar. 4, 2003

(54) LAMP ASSEMBLY WITH VANED LAMP COLLAR

(75) Inventor: Gary D. Basey, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/820,112

(22) Filed: Mar. 28, 2001

(65) Prior Publication Data

US 2002/0141188 A1 Oct. 3, 2002

(51) Int. Cl.$^7$ .............................................. F21V 29/00

(52) U.S. Cl. ....................... 362/264; 362/294; 362/345

(58) Field of Search ................................ 362/263, 264, 362/294, 345, 373; 313/112, 113

(56) References Cited

U.S. PATENT DOCUMENTS

| | | | |
|---|---|---|---|
| 2,779,236 A | 1/1957 | Pollan | 88/24 |
| 4,053,759 A | 10/1977 | Wilkinson | 362/218 |
| 5,251,111 A * | 10/1993 | Nagengast | 362/459 |
| 5,860,719 A | 1/1999 | Suzuki et al. | 353/61 |
| 6,056,405 A * | 5/2000 | Heintz et al. | 353/85 |

* cited by examiner

Primary Examiner—Sandra O'Shea
Assistant Examiner—Ali Alavi
(74) Attorney, Agent, or Firm—Stoel Rives LLP

(57) ABSTRACT

A lamp collar for use in a lamp assembly of an image projector includes vanes that form an air inlet to allow air to flow into and through the lamp assembly to cool the lamp. The vanes direct the air to flow across the lamp to cool it and to circulate within the lamp assembly before exiting through an exhaust opening. The directed air flow serves to cool the lamp and to maintain a substantially constant lamp temperature.

11 Claims, 3 Drawing Sheets

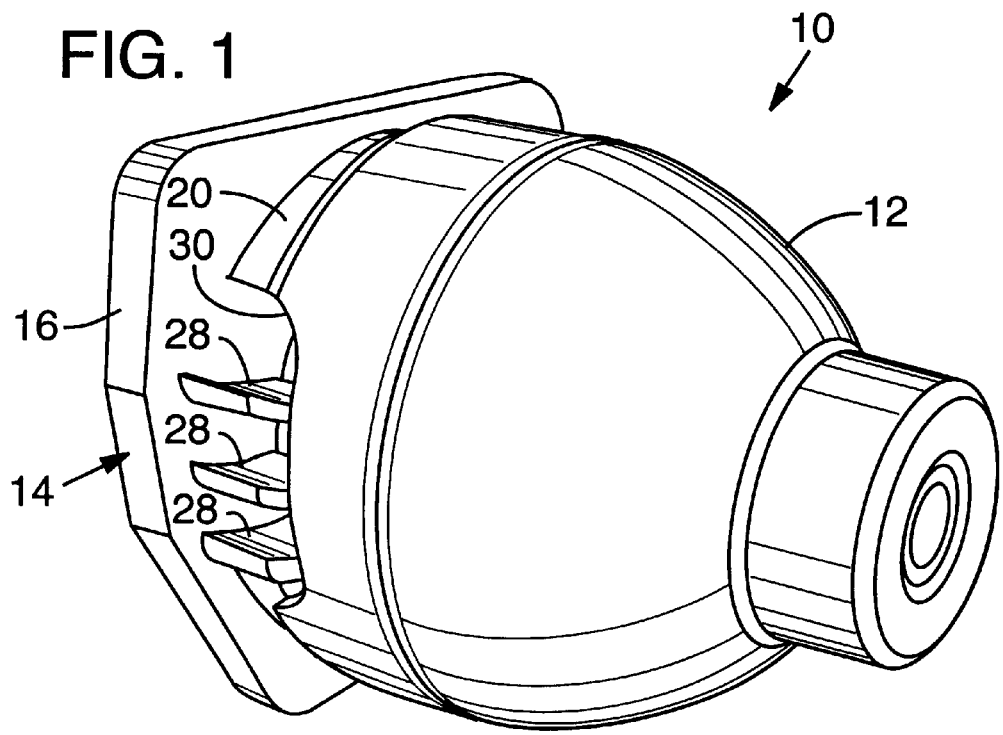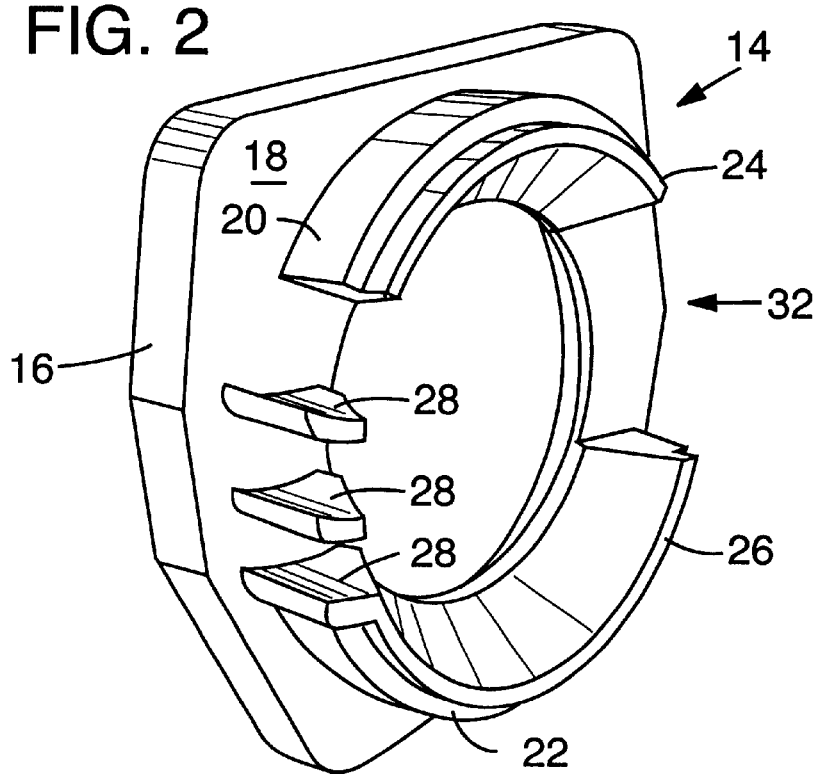

LAMP ASSEMBLY WITH VANED LAMP COLLAR

TECHNICAL FIELD

This invention relates to projection lamps and more particularly to a lamp collar having integral vanes that allow air to circulate within and flow through the lamp reflector to cool and maintain the temperature of the lamp.

BACKGROUND OF THE INVENTION

Image projection systems are becoming increasingly popular for conducting sales demonstrations, business meetings, and classroom instruction. Such image projection systems typically receive analog video signals from a personal computer (PC). The video signals may represent still, partial-, or full-motion display images of a type rendered by the PC. A projection engine of these projection systems includes a light source, an image-forming device, and optical components for directing images onto a screen. The light source typically includes a replaceable lamp module for generating and directing light toward the image-forming device before it is projected onto the screen. In order to produce adequate light intensity, the lamp module includes a light source which may be, for example, a metal-halide or other type of arc lamp, an incandescent lamp, or a fluorescent lamp.

Such image projectors are becoming smaller, more compact, and lighter weight so that they can be carried by one person. The light source operates at high temperatures and must be cooled to prevent damage to the image projector. This is particularly important in smaller image projectors where the components are arranged in a compact manner.

Typical image projection lamp assemblies include a lamp located within a reflector. This assembly is usually positioned within the projector housing near the projection engine by a ceramic collar to which the reflector is attached. The ceramic collar is typically bonded to a front periphery of the reflector with a ceramic-type cement. The ceramic collar is used to locate the lamp assembly within the projector housing such as, for example, by nesting within locator projections on the projector housing.

Heat is produced by the lamp, which typically includes a front-arm and a back arm. The back arm of the lamp connects it to the reflector so that the front arm extends into the reflector. Heat is generally produced under high pressure by the front arm of the lamp, and it is important to keep the temperature of the lamp from exceeding an upper limit to prevent damage to the image projector. Additionally, a temperature differential may develop within the lamp itself. This occurs because heat naturally rises, causing the top of the lamp to become hotter than the bottom of the lamp. Therefore, it is important not only to cool the lamp but to maintain a substantially constant lamp temperature.

Image projection systems typically include a fan to produce an air flow across the lamp assembly to cool it. The lamp assembly is usually located within the projector housing so that the fan blows a directed flow of air across the lamp assembly and out through exhaust openings. The air is generally circulated over and around the reflector. Some of the air may flow into the reflector but any such air is negligible and may not be enough to cool the lamp or maintain a constant lamp temperature. Generally, no air is directed into the reflector to directly flow across the lamp and/or circulate within the reflector.

It is therefore desirable to provide a lamp assembly in which cooling air is directed into the reflector to flow across the lamp and to circulate within the reflector to cool the lamp and maintain a substantially constant lamp temperature.

SUMMARY OF THE INVENTION

It is an object of the invention to provide a lamp assembly that is suitable for use in portable and compact image projectors.

Another object of the invention is to provide a lamp assembly in which the lamp is cooled and maintained at a substantially constant temperature by a directed flow of air.

Yet another object of the invention is to provide a lamp assembly that is configured to allow a flow of cooling air into and through the reflector.

A further object of the invention is to provide a collar for the lamp assembly that includes integral vanes to direct cooling air into and through the reflector.

A lamp assembly of the present invention includes a lamp collar for locating the lamp assembly within an image projector housing. The lamp collar is attached to a front periphery of the reflector and cooperates with locating features on the image projector housing to position and secure the lamp assembly within the image projector housing. The lamp assembly is preferably located adjacent the projection engine. In order to cool the lamp assembly a cooling device such as a fan is located adjacent the lamp assembly so that a cooling flow of air is directed across the lamp assembly.

The lamp collar includes integral vanes that allow air to flow into and through the reflector to cool the lamp. The vanes direct the air to flow along different paths to various parts of the reflector interior. The directed air flow serves to cool the front arm of the lamp and to maintain a substantially constant lamp temperature. Some of the air is directed to flow across the front arm of the lamp to cool it and then flows out of the reflector through an exhaust opening in the lamp collar. Air is also directed along paths to circulate within the reflector before exiting the reflector through the exhaust opening.

The shape of the vanes may vary depending on the where within the reflector the air flow is most desired. Generally, the vanes have the shape of an air foil. In some instances it may be desirable to provide a cut-out portion in the reflector at a location adjacent the vanes to increase the amount of air flowing around and through the reflector.

Additional objects and advantages of this invention will be apparent from the following detailed description of preferred embodiments thereof which proceeds with reference to the accompanying drawings.

BRIEF DESCRIPTION OF THE DRAWINGS

FIG. 1 is an isometric view of a lamp assembly for an image projector having a vaned lamp collar.

FIG. 2 is an isometric view of the vaned lamp collar.

DETAILED DESCRIPTION OF PREFERRED EMBODIMENT

Figure 3:
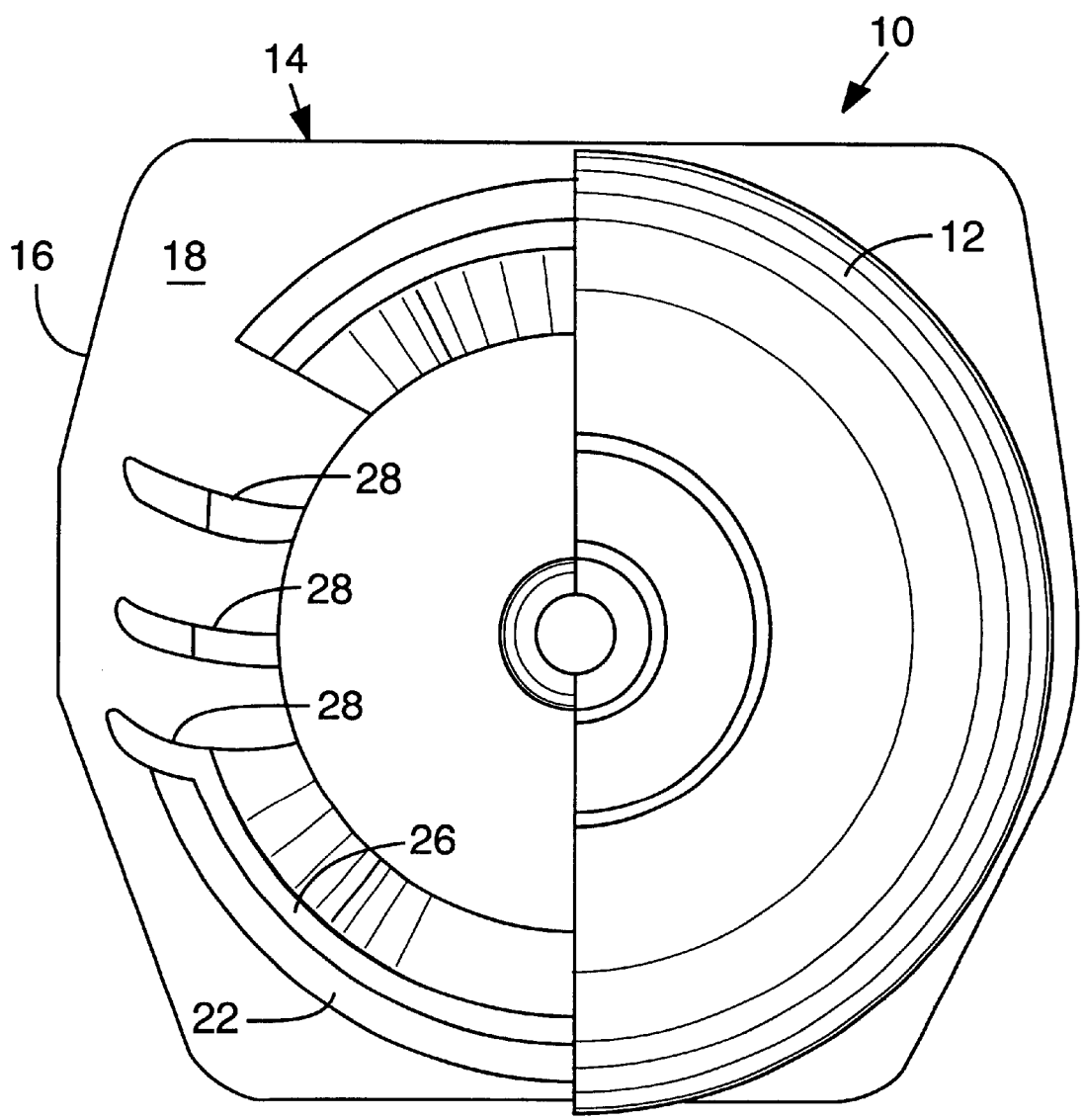
FIG. 3 is a rear view of the lamp assembly with half of the reflector removed to show the vaned lamp collar.

FIG. 1 shows a lamp assembly 10 for use in an image projector (not shown) for generating and directing light toward an image-forming device before it is projected onto a screen. In order to produce adequate light intensity, the lamp assembly 10 includes a light source which may be, for example, a metal-halide or other type of arc lamp, an incandescent lamp, or a fluorescent lamp (not shown in FIG. 1) housed within a reflector 12. To locate the lamp assembly 10 within the image projector a lamp collar 14 is attached to a front periphery of the reflector 12. The lamp collar 14 is adapted for cooperation with locating features on the image projector housing such as, for example, locating pins (not shown) within which the lamp collar 14 is snugly nested. The lamp collar 14 may be connected to the reflector 12 by any suitable connection but is preferably bonded to a front periphery of the reflector 12 with a ceramic-type cement or any suitable adhesive. Furthermore, the lamp collar 14 may be of any suitable material but is preferably ceramic.

As seen most clearly in FIG. 2, the lamp collar 14 includes a base plate 16 having a surface 18 from which an upper flange 20 and a lower flange 22 extend. A lip 24 extends from the upper flange 20, and a lip 26 extends from the lower flange 22. The lips 22, 24 create a contact surface on the upper flange 20 and lower flange 22 for the reflector 12. The reflector 12 is located on the lamp collar 14 so that the lips 24, 26 extend into the interior of the reflector 12 so that the front periphery or front face of the reflector 12 abuts the contact surface.

A plurality of vanes 28 are formed between the upper flange 20 and the lower flange 22 to direct air into and through the reflector 12. The number of vanes 28 and the shape of the vanes 28 may vary depending on a number of factors such as, for example, how much air flow into and through the reflector 12 is desired and the various paths along which the air flow is most desired. The preferred embodiment shown in the figures includes three vanes 28 that have a general shape of an air foil. As shown in the figures the vanes 28 are configured to have the same height as the upper and lower lips 24, 26 so that they actually extend into the interior of the reflector 12. As seen most clearly in FIGS. 2 and 3 the lower lip 26 is integral with one of the vanes 28. The reflector 12 includes a cut-out portion 30 adjacent the vanes 28 to prevent interference with the vanes 28 and to allow a maximum air flow into the reflector interior. However, it is not necessary for the reflector 12 to have the cut-out portion 30. For example, the vanes 28 may have a height less than the upper and lower lips 24, 26 so as to prevent interference between the reflector 12 and the vanes 28. The upper flange 20 and lower flange 28 are spaced by a gap 32 that serves as an exhaust through which the air flows out of the reflector 12. Thus, air flows through the vanes 28 which direct the air into the interior of the reflector 12 to cool the lamp and maintain a substantially constant lamp temperature and out through the exhaust opening 30.

Figure 4:
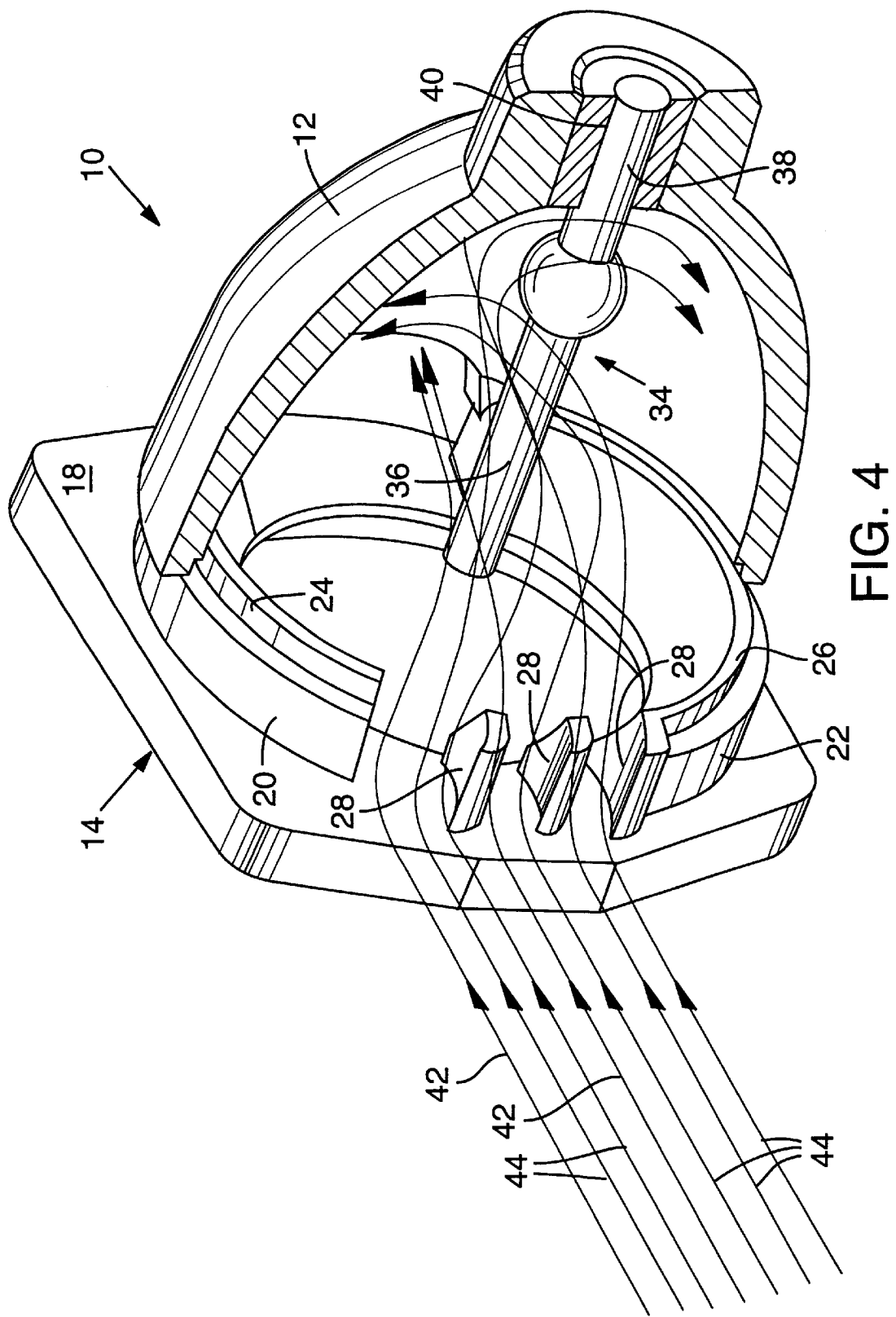
FIG. 4 is an isometric view of the lamp assembly with half of the reflector removed to show air flow paths.

FIG. 4 shows the lamp assembly 10 of the present invention with part of the reflector 12 removed to reveal the interior of the reflector 12. As can be seen the reflector 12 houses a light source in the form of a replaceable lamp 34. The lamp 34 includes a front arm 36 for generating and directing light for projection onto a screen and a back arm 38 for connecting the lamp 34 to the reflector 12. The back arm 38 is connected to the reflector 12 through a bushing 40 into which the back arm 38 is connected by a press fit. The lamp 34 may be any type of light source that produces adequate light intensity. For example, the lamp 34 may be a metal-halide or other type of arc lamp, an incandescent lamp, or a fluorescent lamp. The lamp 34 operates under high pressure and heat generated by the front arm 36 which must be cooled.

The lamp collar 14 directs air into the reflector 12 to directly contact the front arm 36 of the lamp 34 and to circulate within the reflector 12 before flowing out of the reflector 12 through the exhaust opening 30. The air flow is generated by a fan (not shown) and generally flows along various paths as indicated at 42 and 44 as directed by the vanes 28. For example, air that flows along paths 42 are directed to flow directly across the lamp 34 and out of the reflector 12 through the exhaust opening 30. The air that flows along these paths cool the lamp 34 and prevent it from becoming too hot. Air that flows along paths 44 are directed to flow into and circulate within reflector 12 before exiting through the exhaust opening 30. The air that flows along these paths circulates within the reflector 12 to help maintain a substantially constant lamp temperature and to help prevent a substantial temperature differential from developing within the lamp 34 due to heat rising to the top of the lamp 34.

Although the vanes are shown to have an air foil shape they may have any suitable shape to direct the air along any desired path depending on need. Additionally, although only three vanes are shown the number of vanes may vary as well. For example, factors that may determine the number and shape of the vanes include the type of lamp used and the shape of the reflector.

It will be obvious to those having skill in the art that many changes may be made to the details of the above-described embodiment of this invention without departing from the underlying principles thereof. The scope of the present invention should, therefore, be determined only by the following claims.

What is claimed is:

1. A lamp assembly for an image projector, comprising;
    a lamp housed within a reflector, and
    a lamp collar attached to the reflector for locating the lamp assembly within the image projector, the lamp collar including vanes for directing air to flow into the reflector and out of the reflector through an exhaust opening.

2. The lamp assembly of claim 1, in which the vanes are constructed and arranged to direct air to flow across the lamp.

3. The lamp assembly of claim 1, in which the vanes are constructed and arranged to direct air to circulate within the reflector.

4. The lamp assembly of claim 1, in which the lamp collar includes a base with first and second flanges extending from the base, wherein the reflector is attached to the first and second flanges.

5. The lamp assembly of claim 4, wherein the vanes are located between the first and second flanges.

6. The lamp assembly of claim 4, wherein the exhaust opening is located between the first and second flanges.

7. The lamp assembly of claim 1, in which the vanes have the general shape of an air foil.

8. A lamp collar for locating a projection lamp in an image projector in which the projection lamp includes a light source located within a reflector, the lamp collar comprising;
    a base having vanes forming an air inlet side and an exhaust opening forming an air outlet side, the vanes having a shape for directing air to flow along paths from the air inlet side to the air outlet side.

9. The lamp collar of claim 8, further including a first flange and a second flange for connection to the projection lamp, the vanes being located between the first and second flanges.

10. The lamp collar of claim 9, wherein the exhaust opening is located between the first and second flanges.

11. The lamp collar of claim 8, in which the exhaust opening is located opposite the vanes.

* * * * *